United States Patent Office 3,162,411
Patented Dec. 22, 1964

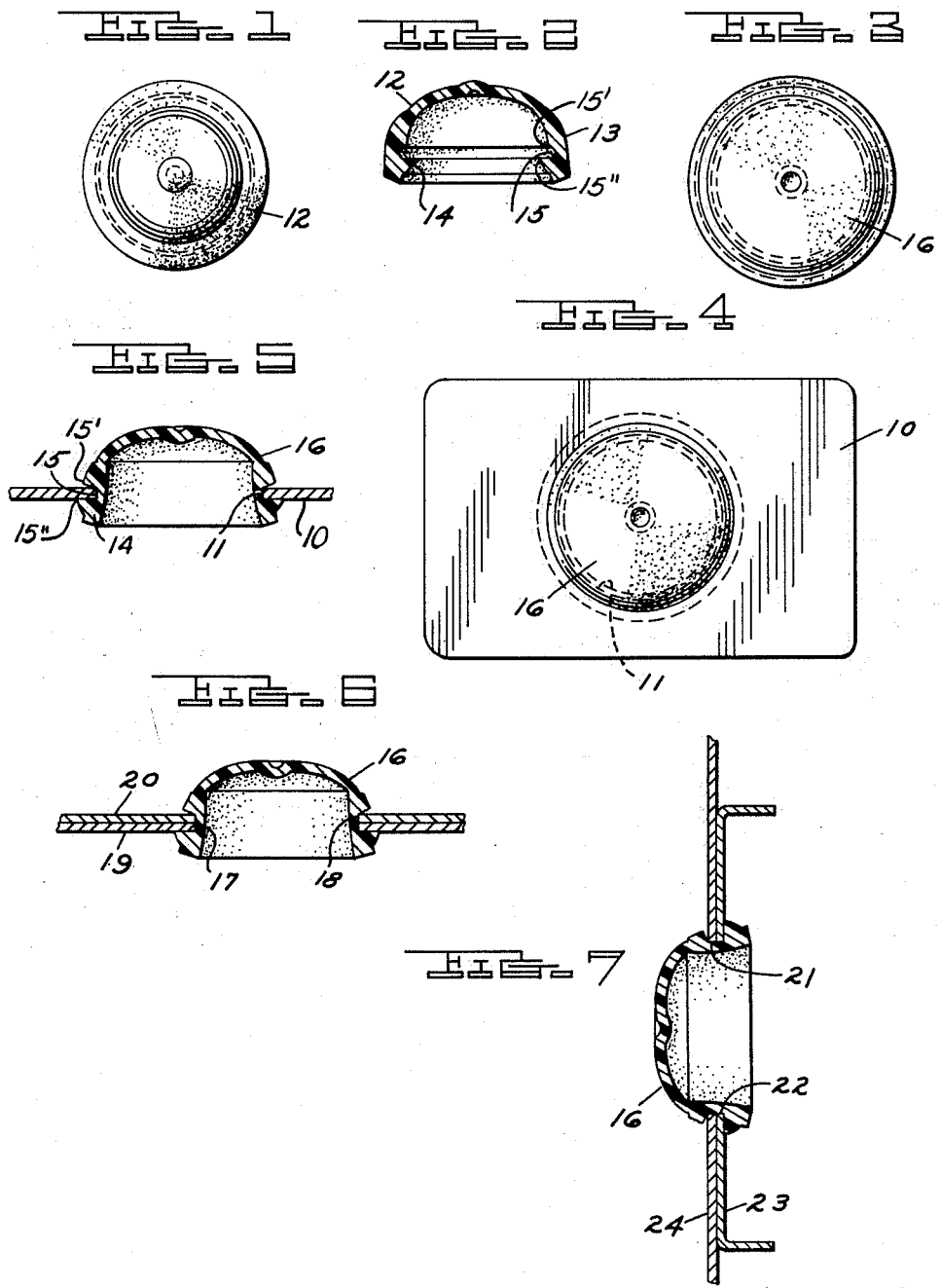

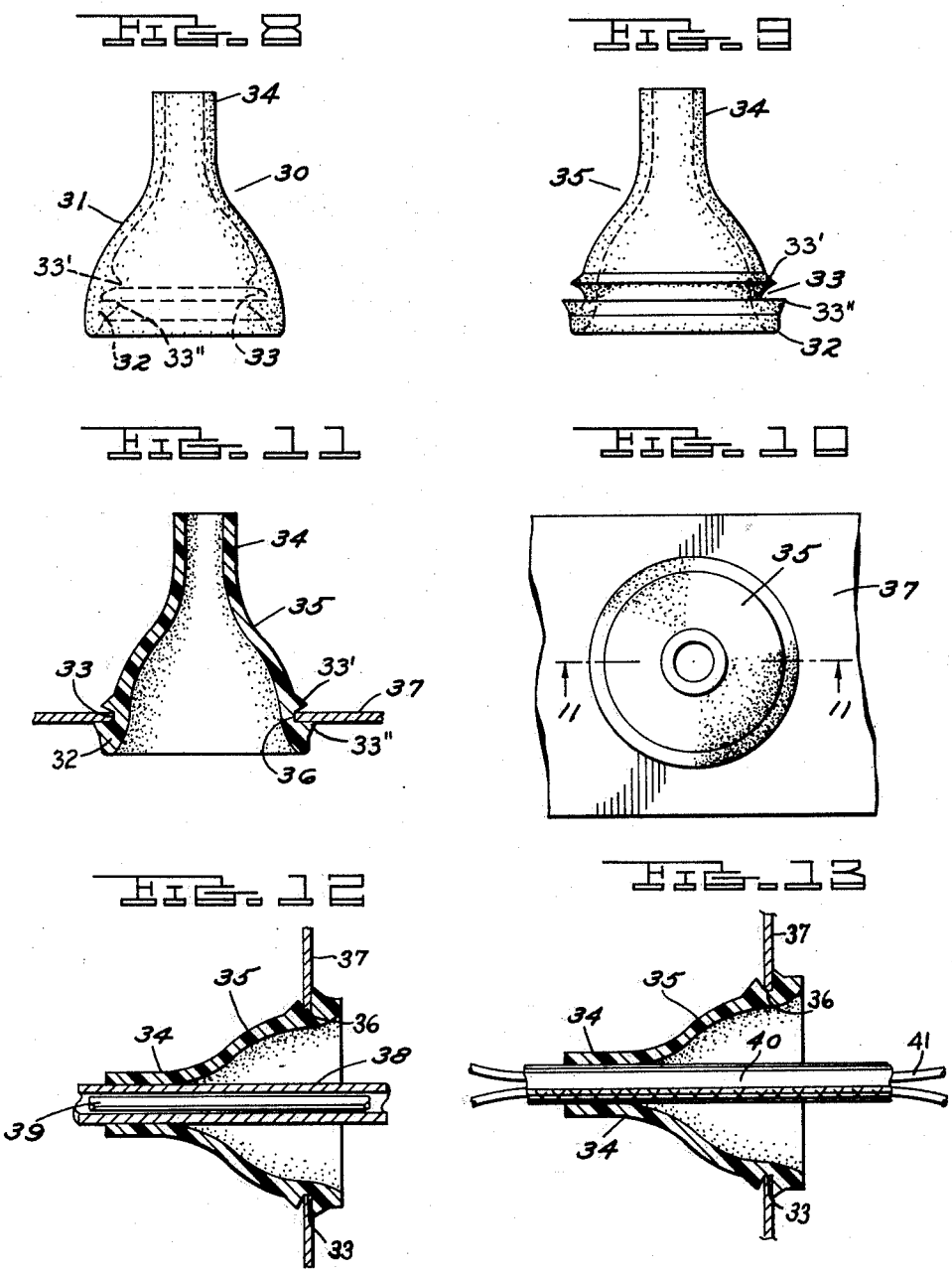

3,162,411
GROMMET ASSEMBLY
James E. Duggan, Berkley, Mich., assignor, by mesne assignments, to Watts Electric & Mfg. Co., Birmingham, Mich., a corporation of Delaware
Filed Mar. 12, 1962, Ser. No. 179,147
2 Claims. (Cl. 248—56)

This invention relates generally to a sealing grommet, and refers more particularly to an invertible sealing grommet.

One of the essential objects of the invention is to provide a grommet that is turned inside out or inverted before being inserted into an opening in an article to receive the same.

Another object is to provide a grommet that has greater holding and sealing power when inverted and inserted as aforesaid.

Another object is to provide a grommet that is made from flexible and sound dampening material that is operable to effectively seal the opening and dampen sound when inserted as aforesaid.

Another object is to make a grommet having an external annular groove, by initially forming a grommet having an annular portion in unstressed condition provided with an internal annular groove, and thereafter completely inverting the entire grommet to locate the annular groove at the exterior thereof, thereby placing the material at the interior of said grommet under compression and simultaneously placing the material at the exterior of said grommet, including the material defining the annular groove, under tension, and inserting said inverted grommet into an opening in an element to cause the material defining the annular groove to sealingly engage the edges of said opening.

Another object is to provide a grommet that is effectively locked in the opening in the article when inserted therein as aforesaid.

Another object is to provide a grommet that requires no post forming operations.

Another object is to provide a grommet that is capable of being inserted into registering openings in two panels or plates to effectively attach said panels or plates to each other and to effectively seal both simultaneously.

Another object is to provide a grommet that is capable of being inserted through registering openings respectively in a metal clip and a panel to effectively attach said clip and panel to each other and to effectively seal both simultaneously.

Another object is to provide a grommet that is simple in construction, economical to manufacture, and efficient in use.

Other objects, advantages and novel details of construction of this invention will be made more apparent as this description proceeds, especially when considered in connection with the accompanying drawings wherein:

FIGURE 1 is a top plan view of a grommet embodying my invention and showing the same before being inverted.

FIGURE 2 is a cross sectional view through the grommet illustrated in FIGURE 1.

FIGURE 3 is a top plan view of the grommet illustrated in FIGURE 1 after it has been inverted.

FIGURE 4 is a top plan view through a panel and showing the inverted grommet attached thereto.

FIGURE 5 is a sectional view taken on the line 5—5 of FIGURE 4.

FIGURE 6 is a sectional view through a slight modification, wherein the inverted grommet is inserted through registering openings in two panels or plates to attach said panels or plates to each other.

FIGURE 7 is a sectional view through another modification wherein the inverted grommet is inserted through registering openings in a metal clip and in a panel to attach said clip and panel to each other.

FIGURE 8 is a side elevational view of another modified form of grommet and showing the same before being inverted.

FIGURE 9 is a side elevational view of the grommet illustrated in FIGURE 8 after it has been inverted.

FIGURE 10 is a top plan view through a panel and showing the inverted grommet in FIGURE 9 attached thereto.

FIGURE 11 is a sectional view taken substantially on the line 11—11 of FIGURE 10.

FIGURE 12 is a view similar to FIGURE 11, and showing the sheathing or tubing for a movable cable extending through and having sealing engagement with the tubular stem portion of the grommet.

FIGURE 13 is a view similar to FIGURE 12 but showing electric wiring extending through and having sealing engagement with the tubular stem portion of the grommet.

Referring now to the drawings, 10 is a panel, preferably of metal, having a circular opening 11 therein, and 12 is a sealing grommet embodying my invention and effectively locked in said opening.

As shown, the grommet 12 is formed from polyvinyl chloride plastisol or any other suitable elastic plastic material that is flexible.

When originally formed, the grommet 12 comprises a substantially cup-shaped body 13 having imperforate walls including an annular portion 14 in unstressed condition provided with laterally spaced annular flanges 15' and 15" cooperating with the annular portion 14 to define an internal annular groove 15. Thereafter, the entire grommet is completely inverted to located the annular groove 15 at the exterior thereof, and such inversion causes the material at the interior of said annular portion 14 to be placed under compression and causes the material at the exterior of said annular portion 14, including the material defining the annular groove 15, to be placed under tension.

The inverted grommet 16 is then inserted into the opening 11 in the panel 10 to cause the laterally spaced annular flanges 15' and 15" cooperating with the annular portion 14 to define the annular channel-shaped groove 15 to sealingly engage the edges of said opening.

When the inverted grommet 16 is inserted into the opening 11 in the panel 10, the annular groove 15 tightly receives the edges of the opening 11, and a greater holding and sealing power is obtained. In fact, the grommet 16 is effectively locked in the opening 11 in the panel 10 when inserted therein as aforesaid. Such grommet 16 is made from flexible and sound dampening material, hence it is operable to effectively seal the opening 11 in the panel, to dampen sound, and to provide the desired flexibility. Moreover, the grommet 16 requires no post forming operations.

In FIGURE 6, I have shown a slight modification wherein the grommet 16 is inserted through registering openings 17 and 18 respectively in two panels or plates 19 and 20 to effectively attach said panels or plates to each other and to effectively seal both simultaneously.

In FIGURE 7, I have shown another modification wherein the inverted grommet 16 is inserted through registering openings 21 and 22 respectively in a metal clip 23 and in a panel 24 to effectively attach said clip 23 and panel 24 to each other and to effectively seal both simultaneously.

In FIGURES 8 to 11 inclusive, I have shown another modification wherein the grommet 30 when originally formed has a generally conical body 31 provided at one end with an annular portion 32 in unstressed condition having laterally spaced annular flanges 33' and 33" cooperating with the annular portion 32 to define an internal annular groove 33, and provided at the other end thereof with an axially extending tubular stem portion 34. This grommet is also formed from polyvinyl chloride plastisol or any other suitable elastic plastic material that is flexible, and has imperforate walls. Thereafter, the entire grommet 30 is completely inverted to locate the annular groove 33 at the exterior thereof, and such inversion causes the material at the interior of said annular portion 32 to be placed under compression, and causes the material at the exterior of said annular portion 32, including the material defining the annular groove 33, to be placed under tension.

The inverted grommet 35 is then inserted into an opening 36 in a panel 37 to cause the laterally spaced annular flanges 33' and 33'' cooperating with the annular portion 32 to define the annular groove 33 to sealingly engage the edges of said opening.

When the inverted grommet 35 is inserted into the opening 36 in the panel 37, the annular groove 33 tightly receives the edges of the opening 36, and a greater holding and sealing power is obtained. In fact the grommet 35 is effectively locked in the opening 36 in the panel when inserted therein as aforesaid. Such grommet 35 is made from flexible and sound dampening material, hence it is operable to effectively seal the opening 36 in the panel, to dampen sound, and provide the desired flexibility. Moreover, such grommet 35 requires no post forming operation.

In FIGURE 12, I have illustrated a view similar to FIGURE 11, wherein the tubular stem portion 34 of the grommet 35 receives and has sealing engagement with suitable sheathing or tubing 38 containing a movable cable 39, such as a speedometer or brake cable.

In FIGURE 13, I have illustrated a view similar to FIGURE 12, wherein the tubular stem portion 34 of said grommet 35 receives and has sealing engagement with suitable sheathing 40 for electric wiring 41 or the like.

What I claim as my invention is:

1. A grommet assembly, comprising a sheet metal member having a circular opening therein, and a reversible resilient grommet, after being reversed, having a hollow substantially conical body provided with imperforate walls, provided with a relatively large open end, provided with a relatively small opposite open end, provided at the relatively small open end thereof with an axially extending tubular stem projecting endwise from and registering with the relatively small open end of said conical body and having imperforate walls, and provided at the relatively large open end thereof with an annular portion extending through and fitting tightly within said circular opening, said annular portion having on the outer walls thereof a pair of laterally spaced annular flanges cooperating with said annular portion to define an annular channel-shaped groove opening outwardly from said annular portion at substantially right angles to the axis of said conical body and receiving and sealingly engaging the edges of said circular opening, thereby causing the material at the interior of said annular portion to be under compression and simultaneously causing the material at the exterior of said annular portion, including the material defining the outwardly opening annular channel-shaped groove, to be under tension.

2. The grommet assembly defined in claim 1, wherein a length of sheathing containing at least one elongated element extends lengthwise through said tubular stem and said conical body and has an exterior cross section substantially equal to the interior cross section of said tubular stem, whereby said sheathing has sealing engagement with said tubular stem.

References Cited by the Examiner

UNITED STATES PATENTS

| | | | |
|---|---|---|---|
| 1,697,814 | 1/29 | Forbes. | |
| 2,218,308 | 10/40 | Comer. | |
| 2,536,655 | 1/51 | Nebesar | 214—41 |
| 2,823,249 | 2/58 | Curtiss | 220—60 |
| 2,848,746 | 8/58 | Thielen | 29—451 |
| 3,021,975 | 2/62 | Sarafinas | 220—60 |

FOREIGN PATENTS 901,632   1/54   Germany.

THERON E. CONDON, *Primary Examiner.*

FRANKLIN T. GARRETT, EARLE J. DRUMMOND,
*Examiners.*